J. R. UNDERWOOD.
CHURN-DASHER.
No. 171,069. Patented Dec. 14, 1875.
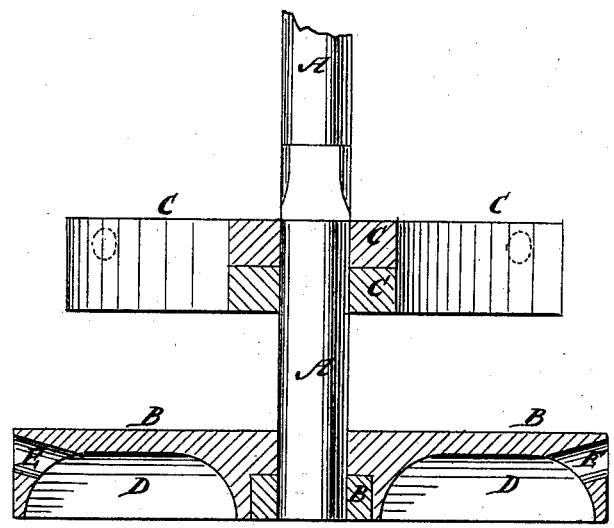
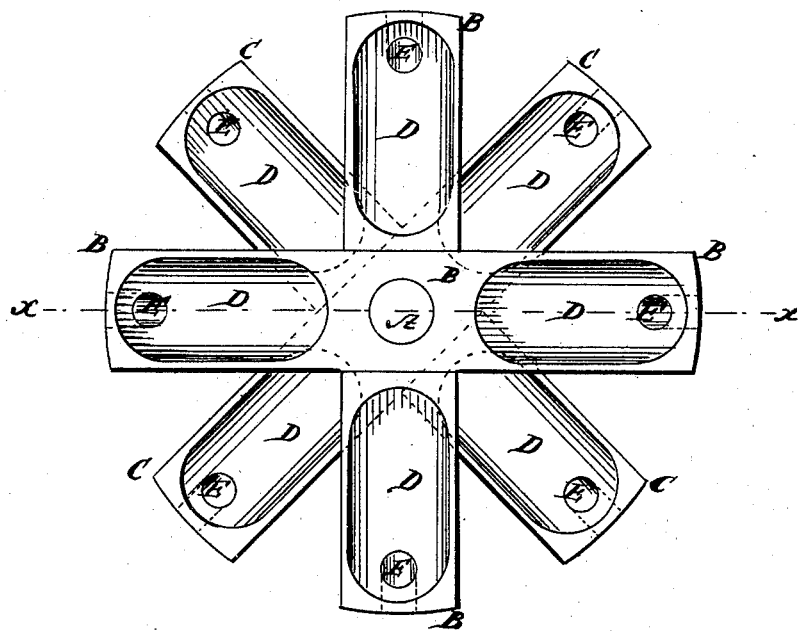

UNITED STATES PATENT OFFICE.

JOHN R. UNDERWOOD, OF NELSONVILLE, OHIO.

IMPROVEMENT IN CHURN-DASHERS.

Specification forming part of Letters Patent No. 171,069, dated December 14, 1875; application filed October 2, 1875.

*To all whom it may concern:*

Be it known that I, JOHN RILEY UNDERWOOD, of Nelsonville, in the county of Athens and State of Ohio, have invented a new and useful Improvement in Churn-Dasher, of which the following is a specification:

Figure 1 is a side view of my improved dasher, partly in section, through the line $x$ $x$, Fig. 2. Fig. 2 is a bottom view of the same.

Similar letters of reference indicate corresponding parts.

The object of this invention is to furnish an improved dasher for the ordinary dasher-churn, which shall be so constructed as to throw the milk into violent agitation, and thus bring the butter in a very short time, and which shall be simple in construction and inexpensive in manufacture.

The invention consists in an improved churn-dasher formed by the combination, with each other and with the dasher-shaft, of the two sets of bars, the bars of each set being arranged at right angles with each other, and the bars of the two sets being so arranged that the end of each bar of each set may be opposite the space between the ends of two bars of the other set, and the end part of each bar being provided with a recess upon its lower side, and with an inclined hole leading from said recess through the end of the said bar, as hereinafter fully described.

A is the dasher shaft or handle, to the lower end of which are attached the centers of two bars, B, that cross each other at right angles at their centers. To the dasher-shaft A, a little above the bars B, are attached the centers of two cross-bars, C, which cross each other at right angles at their centers, and are so arranged that the ends of the bars C may be directly above the spaces between the ends of bars B, so that the end of each bar may act upon the milk in a different place. In the lower side of the end parts of the bars B C are formed recesses D, from each of which a hole, E, is formed leading out through the ends of the said bars B C with a slight upward inclination, as shown in Figs. 1 and 2.

With this construction, when the dashers are forced down, the bars B C enter the milk with the recesses D filled with air, and the air and milk are forced out through the holes E toward the sides of the churn, throwing the milk into violent agitation, and bringing the butter in a very short time.

Having thus described my invention, I claim as new and desire to secure by Letters Patent—

A churn-dasher, composed of cross-bars having the subjacent cavities D and lateral end holes E, as and for the purpose specified.

JOHN R. UNDERWOOD.

Witnesses:
JAMES MCFALL,
JOHN HAROLD.